US012710751B2

(12) United States Patent
Fischer

(10) Patent No.: US 12,710,751 B2
(45) Date of Patent: Aug. 18, 2026

(54) TRANSMITTING SIDEBAND DATA TO ENABLE TELE-OPERATION OF A VEHICLE

(71) Applicant: Nissan North America, Inc., Franklin, TN (US)

(72) Inventor: Mark Fischer, Santa Rosa, CA (US)

(73) Assignee: Nissan North America, Inc., Franklin, TN (US)

( * ) Notice: Subject to any disclaimer, the term of this patent is extended or adjusted under 35 U.S.C. 154(b) by 251 days.

(21) Appl. No.: 18/191,320

(22) Filed: Mar. 28, 2023

(65) Prior Publication Data

US 2024/0329632 A1 Oct. 3, 2024

(51) Int. Cl.

| | |
|---|---|
| ***G05D 1/221*** | (2024.01) |
| ***G05D 1/00*** | (2006.01) |
| ***H04L 65/65*** | (2022.01) |
| *G05D 1/224* | (2024.01) |
| *G05D 1/226* | (2024.01) |
| *G05D 1/227* | (2024.01) |

(52) U.S. Cl.

CPC ........... *G05D 1/0038* (2013.01); *H04L 65/65* (2022.05); *G05D 1/221* (2024.01); *G05D 1/2245* (2024.01); *G05D 1/2246* (2024.01); *G05D 1/2247* (2024.01); *G05D 1/226* (2024.01); *G05D 1/227* (2024.01)

(58) Field of Classification Search

CPC .. G05D 1/0016; G05D 1/0038; G05D 1/0044; G05D 1/2247; G06V 10/751; G06V 20/588; B60W 60/001; B60W 2556/45; H04L 65/65

See application file for complete search history.

(56) References Cited

U.S. PATENT DOCUMENTS 5,155,683 A 10/1992 Rahim
5,541,845 A 7/1996 Klein
(Continued)

FOREIGN PATENT DOCUMENTS

CN 108347436 A * 7/2018
CN 109345804 A * 2/2019
(Continued)

OTHER PUBLICATIONS

Multimedia Sensor Dataset for the Analysis of Vehicle Movement, Wonhee Cho and Seon Ho Kim, ACM MMSys 2017 p. 175 (Year: 2017).*

(Continued)

*Primary Examiner* — Fadey S. Jabr
*Assistant Examiner* — Ashutosh Pande
(74) *Attorney, Agent, or Firm* — Young Basile Hanlon & MacFarlane, P.C.

(57) ABSTRACT

A system may generate visual data from a vehicle in a transportation network. The system may also generate sideband data from the vehicle. The sideband data may encapsulate a serialization of vehicle information collected using one or more sensors of the vehicle. In some implementations, the sideband data may be formatted according to JavaScript Object Notation (JSON) to enable reconstruction of the vehicle information by a server. The sideband data may be associated with timing information used to correlate the vehicle information to the visual data. The system may transmit a stream including the visual data and the sideband data to the server to enable tele-operation of the vehicle.

20 Claims, 8 Drawing Sheets

(56) References Cited

U.S. PATENT DOCUMENTS 9,494,935 B2 11/2016 Okumura et al.
9,658,615 B2 5/2017 Pack et al.
10,317,899 B2 * 6/2019 Liu ...................... G05D 1/0038
10,567,497 B2 * 2/2020 Charalambides .... G05D 1/1064
10,666,351 B2 * 5/2020 Ziskin .................. H04N 21/242
10,965,728 B2 * 3/2021 Esmail ................ H03M 7/3059
11,099,558 B2 * 8/2021 Huang ................. G05D 1/0221
11,115,112 B2 * 9/2021 Christomanos ..... H04L 43/0882
11,390,301 B2 * 7/2022 Hari .................. B60W 60/0016
11,688,079 B2 * 6/2023 Soon-Shiong .......... G06F 16/70 348/157
11,912,301 B1 * 2/2024 Hendy ............ B60W 60/00276
12,002,223 B2 * 6/2024 Soon-Shiong ......... H04N 7/181
12,029,156 B1 7/2024 Simpson
12,057,928 B2 * 8/2024 Duval .................. A61B 5/0015
2006/0004512 A1 1/2006 Herbst et al.
2007/0198144 A1 * 8/2007 Norris ............... B60W 60/0053 701/23
2008/0165140 A1 7/2008 Christie et al.
2012/0191269 A1 7/2012 Chen et al.
2015/0248131 A1 9/2015 Fairfield et al.
2016/0323565 A1 * 11/2016 van Baarsen ........ H04N 9/8211
2016/0358475 A1 * 12/2016 Prokhorov ........... G05D 1/0088
2017/0285649 A1 10/2017 Debreczeni
2018/0027265 A1 * 1/2018 Ziskin ................ H04L 65/1069 725/116
2018/0139585 A1 * 5/2018 Gholmieh ........... H04L 65/1069
2018/0329413 A1 * 11/2018 Charalambides ........ G08G 5/55
2018/0329671 A1 * 11/2018 Einziger ................. G06F 3/162
2018/0342080 A1 11/2018 Maddern et al.
2019/0049968 A1 * 2/2019 Dean .................... G05D 1/0255
2019/0286153 A1 9/2019 Rankawat et al.
2019/0302761 A1 * 10/2019 Huang ................. G02B 27/017
2020/0041994 A1 * 2/2020 Alalao ................. G05D 1/0022
2020/0128061 A1 * 4/2020 Esmail .................... H04W 4/48
2020/0177660 A1 * 6/2020 Connor ................. H04L 69/326
2020/0184809 A1 6/2020 Lee
2020/0202644 A1 * 6/2020 Shi ....................... G05D 1/0016
2020/0269877 A1 8/2020 Mortazavi et al.
2020/0349844 A1 11/2020 Rosenzweig et al.
2020/0356097 A1 * 11/2020 Berkemeier ......... G05D 1/0212
2020/0368629 A1 11/2020 Moss
2021/0018916 A1 1/2021 Thakur et al.
2021/0031808 A1 2/2021 Nakagawa et al.
2021/0191392 A1 * 6/2021 Talavera ................ G08G 5/723
2021/0223771 A1 7/2021 Whitney et al.
2021/0240190 A1 * 8/2021 Wray ................. B60W 60/0011
2021/0389769 A1 * 12/2021 Hari ..................... G05B 13/027
2022/0126864 A1 * 4/2022 Moustafa .......... B60W 60/0013
2022/0147042 A1 * 5/2022 Trank ............... G08G 1/096741
2022/0185115 A1 6/2022 Divekar et al.
2022/0194419 A1 6/2022 Houshmand et al.
2022/0236741 A1 7/2022 Bridenbaugh et al.
2022/0263722 A1 * 8/2022 Kodaypak ............... H04L 65/65
2022/0413483 A1 * 12/2022 Choi .................... G05D 1/0214
2023/0176573 A1 6/2023 Kumavat et al.
2024/0142967 A1 5/2024 MacGregor et al.
2024/0205274 A1 * 6/2024 Khalil ................... H04W 28/16
2024/0296570 A1 * 9/2024 Soon-Shiong ..... G09B 19/0038
2024/0310841 A1 9/2024 Samuels et al.
2024/0430319 A1 * 12/2024 Allen .................... H04L 65/612
2025/0189965 A1 * 6/2025 Trank ................... H04N 19/436

FOREIGN PATENT DOCUMENTS

CN 111512609 A * 8/2020 ......... H04L 65/1016
CN 110850865 B 8/2022
EP 4462217 A1 * 11/2024 ............. G06F 3/167
WO WO-2021002911 A1 * 1/2021 ............ B25J 9/1676
WO 2021194254 A1 9/2021
WO WO-2021233588 A1 * 11/2021 ......... H04L 65/1016
WO 2022147274 A1 7/2022
WO WO-2022234574 A1 * 11/2022 ............... G08G 5/80

OTHER PUBLICATIONS

Multimedia Sensor Dataset for Analysis of Vehicle Movement, Wonhee et al.Powerpoint Presentation (Year: 2017).*

RTP Payload Format for H.264 Video Streams Extensions Microsoft Publication MS-H264PF-v20170915 (Year: 2017).*

Stack overflow website: answer to question on how to send video file using JSON method (Year: 2014).*

Internet Engineering Task Force RFC 8860, Jan. 2021 (Year: 2021).*

* cited by examiner

SIDEBAND DATA
5040
SERIALIZATION
5020
TIMING
INFORMATION
5030
VEHICLE
INFORMATION
5010

TRANSMITTING SIDEBAND DATA TO ENABLE TELE-OPERATION OF A VEHICLE

TECHNICAL FIELD

This disclosure relates generally to vehicles, and more particularly to transmitting sideband data to enable tele-operation of a vehicle.

BACKGROUND

Certain vehicles, such as autonomous vehicles (AVs), rovers, drones, and the like, can collect information from sensors and receive direction remotely. For example, AVs offer human drivers the convenience of efficient conveyance from one location to another without having to direct their attention to the state of the road. An AV can be defined as a self-driven (e.g., computer controlled) vehicle that is capable of driving on roadways while obeying traffic rules and norms. However, even the best AV programming cannot account for, and control, all conditions and situations that can arise during operation of the AV. Furthermore, there are times when the AV encounters conditions and situations that might benefit from the assistance of a human operator (e.g., a tele-operator).

SUMMARY

Disclosed herein are aspects, features, elements, implementations, and embodiments of transmitting sideband data to enable tele-operation of a vehicle.

Some implementations may include a method, comprising generating visual data from a vehicle in a transportation network; generating sideband data from the vehicle, the sideband data encapsulating a serialization of vehicle information collected using one or more sensors of the vehicle, wherein the sideband data is associated with timing information used to correlate the vehicle information to the visual data; and transmitting a stream including the visual data and the sideband data to enable tele-operation of the vehicle. In some implementations, the visual data comprises one or more images collected from a camera of the vehicle. In some implementations, the visual data comprises point cloud data collected from a Lidar (light detection and ranging) sensor of the vehicle. In some implementations, the sideband data is formatted according to at least one of JavaScript Object Notation (JSON), YAML, Binary JSON (BSON), or MessagePack to enable reconstruction of the vehicle information by a server. In some implementations, the method may include encoding the visual data and the sideband data as Real-time Transport Protocol (RTP) packets in the stream. In some implementations, the stream is transmitted, via cellular communication, Campus Wi-Fi, or other radio link, to a server using at least one of Real-Time Streaming Protocol (RTSP), Real-Time Messaging Protocol (RTMP), or Reliable Internet Stream Transport (RIST). In some implementations, the method may include applying the timing information, based on a time from a global positioning system and before transmitting the stream, to the sideband data to enable a server to correlate the vehicle information to the visual data. In some implementations, the method may include receiving the stream that includes the visual data and the sideband data; de-serializing the sideband data to re-construct the vehicle information; and displaying the visual data and the vehicle information in a web browser to perform the tele-operation. In some implementations, the vehicle information indicates an object detection and a vehicle location in the transportation network.

Some implementations may include an apparatus, comprising a memory and a processor configured to execute instructions stored in the memory to generate visual data from a vehicle in a transportation network; generate sideband data from the vehicle, the sideband data encapsulating a serialization based on JSON of vehicle information collected using one or more sensors of the vehicle, wherein the sideband data includes a timestamp used to correlate the vehicle information to the visual data; and transmit a stream including the visual data and the sideband data to enable tele-operation of the vehicle. In some implementations, the visual data comprises one or more images collected from a camera of the vehicle. In some implementations, the visual data is encoded based on H.264. In some implementations, the processor is further configured to execute instructions stored in the memory to encode the visual data and the sideband data as RTP packets in the stream. In some implementations, the stream is transmitted, via a cellular telephone network, Campus Wi-Fi, or other radio link, to a server using at least one of RTSP, RTMP, or RIST. In some implementations, the processor is further configured to execute instructions stored in the memory to apply the timestamp, based on a time from a global positioning system and before transmitting the stream, to the sideband data to enable a server to correlate the vehicle information to the visual data.

Some implementations may include a non-transitory computer readable medium storing instructions operable to cause one or more processors to perform operations comprising receiving a stream from a vehicle in a transportation network, the stream including visual data and sideband data that encapsulates a serialization of vehicle information collected using one or more sensors of the vehicle, wherein the sideband data is associated with timing information used to correlate the vehicle information to the visual data; de-serializing the sideband data to re-construct the vehicle information and correlate the vehicle information to the visual data; and displaying the visual data and the vehicle information in a web browser to enable tele-operation of the vehicle. In some implementations, the serialization uses human-readable text. In some implementations, the operations further comprise decoding RTP packets in the stream to obtain the visual data and the sideband data. In some implementations, the stream is received, via a cellular telephone network, Campus Wi-Fi, or other radio link, by a server using a port configured for RTSP, RTMP, or RIST. In some implementations, the vehicle may be an AV, rover, drone, or aircraft. In some implementations, the vehicle information may indicate vehicle velocity; vehicle location; vehicle operational state; vehicle destination; vehicle route; and vehicle sensor data.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

Figure 1:
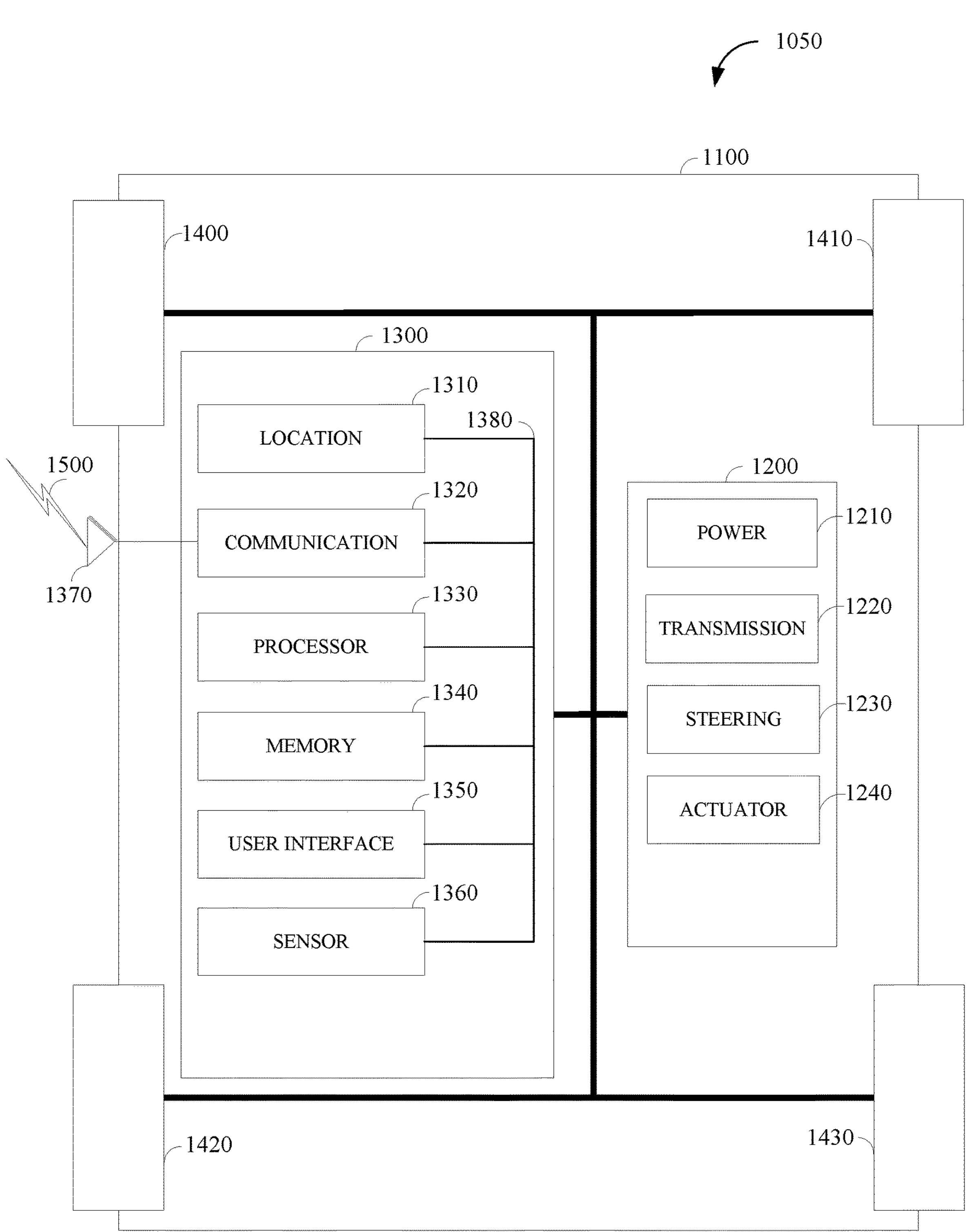
FIG. 1 is a diagram of an example of a portion of a vehicle in which the aspects, features, and elements disclosed herein may be implemented.

Teleoperation can enable a vehicle, such as an AV, rover, drone, or aircraft, to ensure safety during a trip, such as in situations where an artificial intelligence (AI) system of the vehicle is unable to determine an optimum course of action. For example, a vehicle such as an AV may not be able to fully assess, classify, and/or understand the intentions of other road users. The other road users can include pedestrians, construction workers, policemen, construction equipment, vehicles, cyclists, or other static objects (e.g., buildings, road signs, etc.). For example, assessing the road situation may be outside the sensing capabilities of the vehicle, such as in the case of identifying whether other road users are present around a corner that is obstructed by a building or whether other road users are present on the other side of a hill. Furthermore, resolving some situations (e.g., obstruction situations) may require the vehicle to deviate from the normal (e.g., legal, socially acceptable) rules of driving in a manner that is unacceptable without human oversight.

Teleoperation may be enabled by allowing a tele-operator to remotely navigate a vehicle by utilizing a video stream of the environment in front and around the vehicle. However, in some cases, it may be difficult for a tele-operator to understand the current situation of the vehicle. For example, the tele-operator might not be aware of certain information that may be relevant to the vehicle (e.g., another vehicle approaching from the rear), particularly at a moment when the tele-operator is viewing a real-time feed of the video stream. For example, receiving information that is more than 1/10th of a second off from when the information is relevant to images in the video stream may in some cases limit effective tele-operation of the vehicle.

Implementations of this disclosure address problems such as these by transmitting, from a vehicle, sideband data that can be synchronized to visual data to enable tele-operation of a vehicle in a transportation network. The sideband data may enable information to be annotated to a real-time stream of visual data, with a time synchronization to the visual data, without requiring predetermined knowledge of the start and end of the stream (e.g., without utilizing offsets). A system implemented by the vehicle can generate visual data, such as images collected from a camera of the vehicle. The system can also generate sideband data from the vehicle. The sideband data may encapsulate a serialization of vehicle information collected using one or more sensors of the vehicle. For example, the vehicle information could indicate an object detection (e.g., obstacles, such as fixed obstacles, vehicles, cyclists, and pedestrians); vehicle velocity; vehicle location; vehicle operational state; vehicle destination; vehicle route; and/or vehicle sensor data. The sideband data may be formatted (e.g., serialized), for example, according to at least one of JavaScript Object Notation (JSON), YAML, Binary JSON (BSON), or MessagePack to enable reconstruction of the vehicle information by a server. The sideband data may be associated with timing information (e.g., a timestamp) used to correlate the vehicle information to the visual data. The system can then transmit a stream including the visual data and the sideband data to enable tele-operation of the vehicle. In some cases, a server can receive the stream from the vehicle in the transportation network. The stream can include the visual data and the sideband data that encapsulates the serialization of vehicle information collected using one or more sensors of the vehicle. The server can de-serialize the sideband data to re-construct the vehicle information and correlate the vehicle information to the visual data based on the timing information. The server can then display the visual data and the vehicle information in a web browser to enable tele-operation of the vehicle (e.g., by a tele-operator using the web browser to observe the situation and provide input to perform the tele-operation).

To describe some implementations in greater detail, reference is made to the following figures.

FIG. 1 is a diagram of an example of a vehicle 1050 in which the aspects, features, and elements disclosed herein may be implemented. The vehicle 1050 may include a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller, tread, or ducted fan, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy chemical energy, or thermal energy. For example, the power source 1210 includes an engine, such as an internal combustion engine, an electric motor, or a combination of an internal combustion engine and an electric motor, and is operative to provide energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy from the power source 1210 and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including the operations center. The instructions for remote operation may be stored in the vehicle 1050 or received from an external source such as a traffic management center, or server computing devices, which may include cloud-based server computing devices. The processor 1330 may be configured to execute instructions for following a projected path as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 may store instructions operable to cause the processor 1330 to perform operations. The memory 1340 is, for example, one or more solid state drives, one or more memory cards, one or more removable media, one or more read only memories, one or more random access memories, one or more solid-state drives, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems (e.g., Lidar), infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
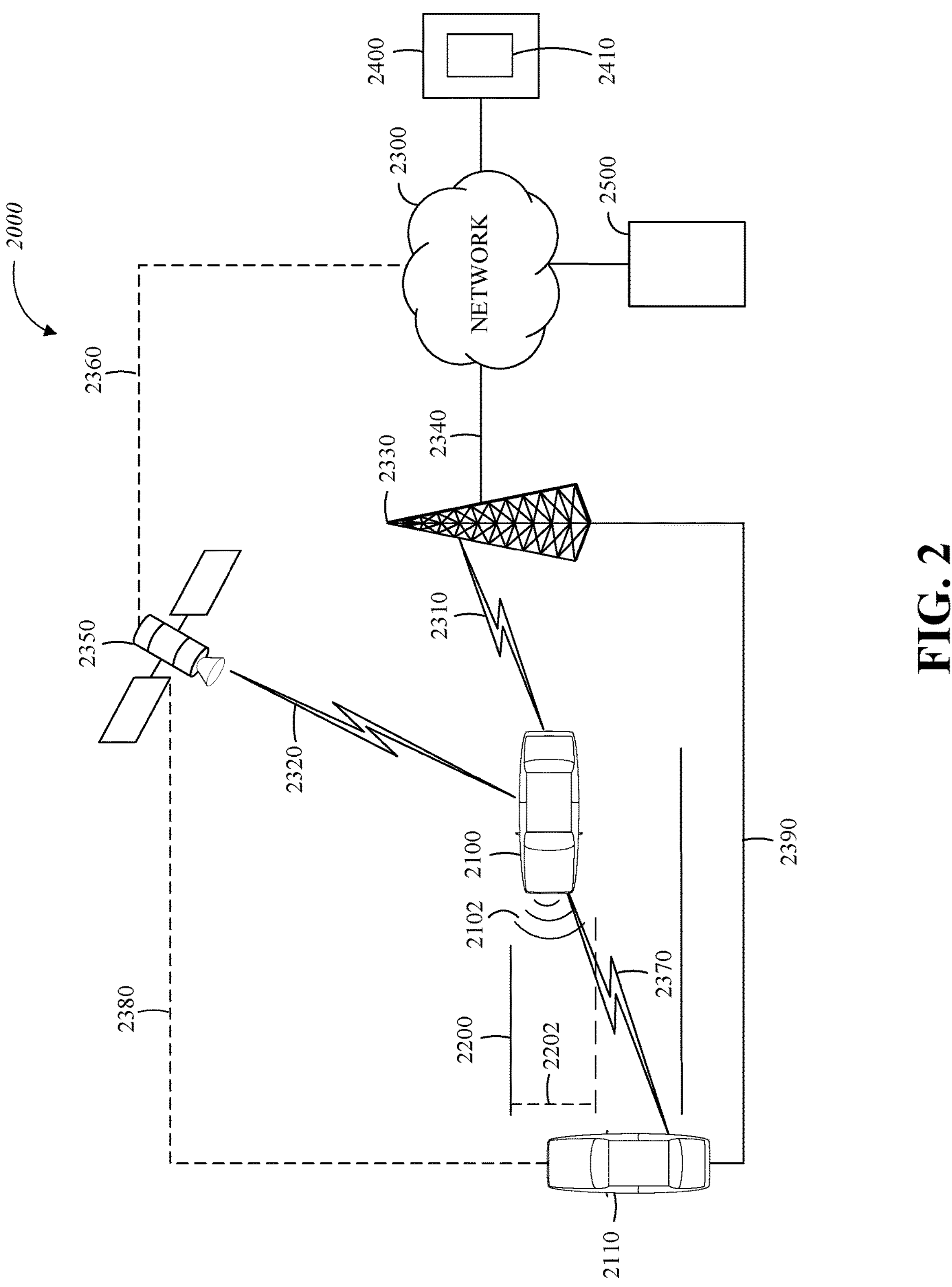
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor (e.g., a microphone or acoustic sensor), a compass, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
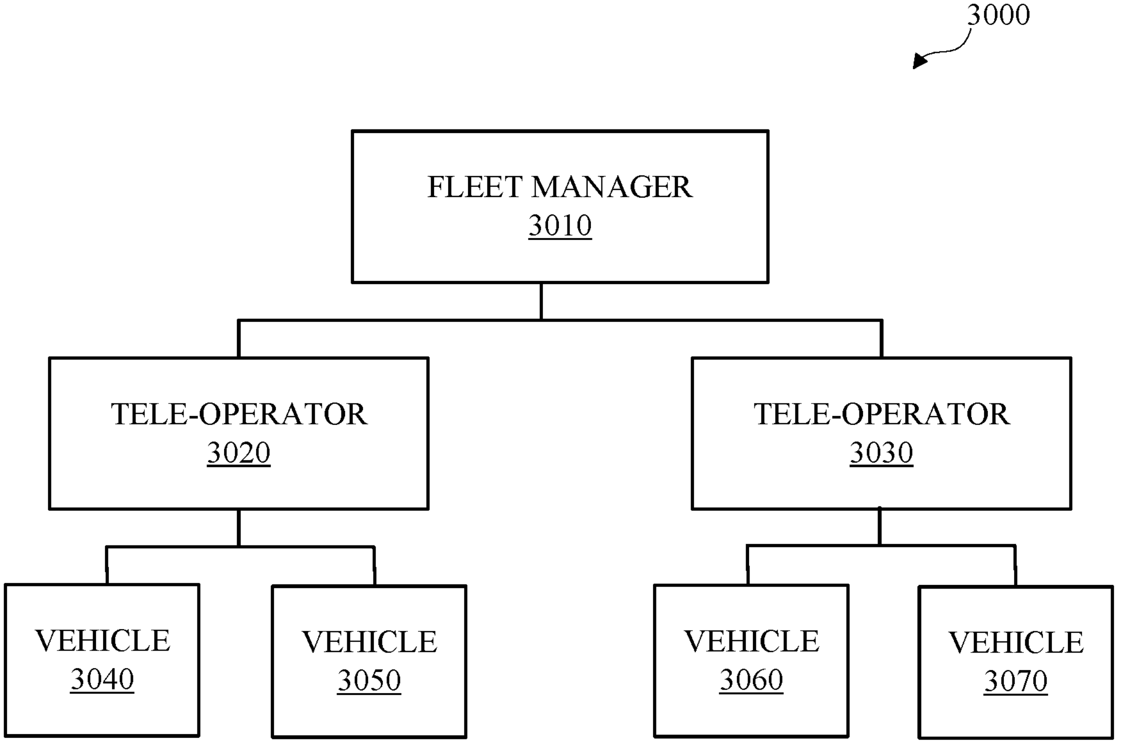
FIG. 3 is a block diagram illustrating a remote vehicle assistance center according to implementations of this disclosure.

FIG. 3 is a block diagram illustrating a remote vehicle assistance center 3000 according to implementations of this disclosure. The remote vehicle assistance center 3000 can also be referred to as a remote system or a tele-operations center. The remote vehicle assistance center 3000 includes a fleet manager 3010, a plurality of vehicle managers (i.e., tele-operators) including but not limited to a tele-operator 3020 and a tele-operator 3030, and a plurality of vehicles including but not limited to vehicles 3040, 3050, 3060, and 3070.

The fleet manager 3010 can include an apparatus including some or all of the features of the controller 1300 shown in FIG. 1 or the controller apparatus 2410 of FIG. 2. The fleet manager 3010 can monitor and coordinate tele-operators, including the tele-operators 3020/3030 as well as the movement of vehicles, including autonomous vehicles, and the vehicles 3040, 3050, 3060, and 3070. Monitoring and coordinating the tele-operators can include any of assigning, allocating, or deallocating vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 3020 can monitor the state or condition of vehicles, including the vehicle 3040 and the vehicle 3050. As illustrated in FIG. 3, the tele-operator 3020 has been assigned vehicle 3040 and vehicle 3050. The assignment of vehicles to a tele-operator can be performed by a fleet manager such as the fleet manager 3010.

The tele-operator 3030 can monitor the state or condition of vehicles, including the vehicle 3060 and the vehicle 3070. As illustrated in FIG. 3, the tele-operator 3030 has been assigned vehicle 3060 and vehicle 3070. The assignment of vehicles to a tele-operator can be performed by a fleet manager such as the fleet manager 3010. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of vehicle velocity; vehicle location; vehicle operational state; vehicle destination; vehicle route; vehicle sensor data; external object velocity; and external object location.

In the description herein, sentences describing the vehicle as taking an action (such as performing, determining, initiating, receiving, calculating, deciding, etc.) are to be understood that some appropriate module of the vehicle as taking the action. Such modules may be stored in a memory of the vehicle, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the vehicle, a processor of an operations center, or a combination thereof. For example, the statement "the vehicle determines a trajectory" can be understood to mean that "a module of the vehicle determines a trajectory" or "a trajectory planning module of the vehicle determines a trajectory."

Figure 4:
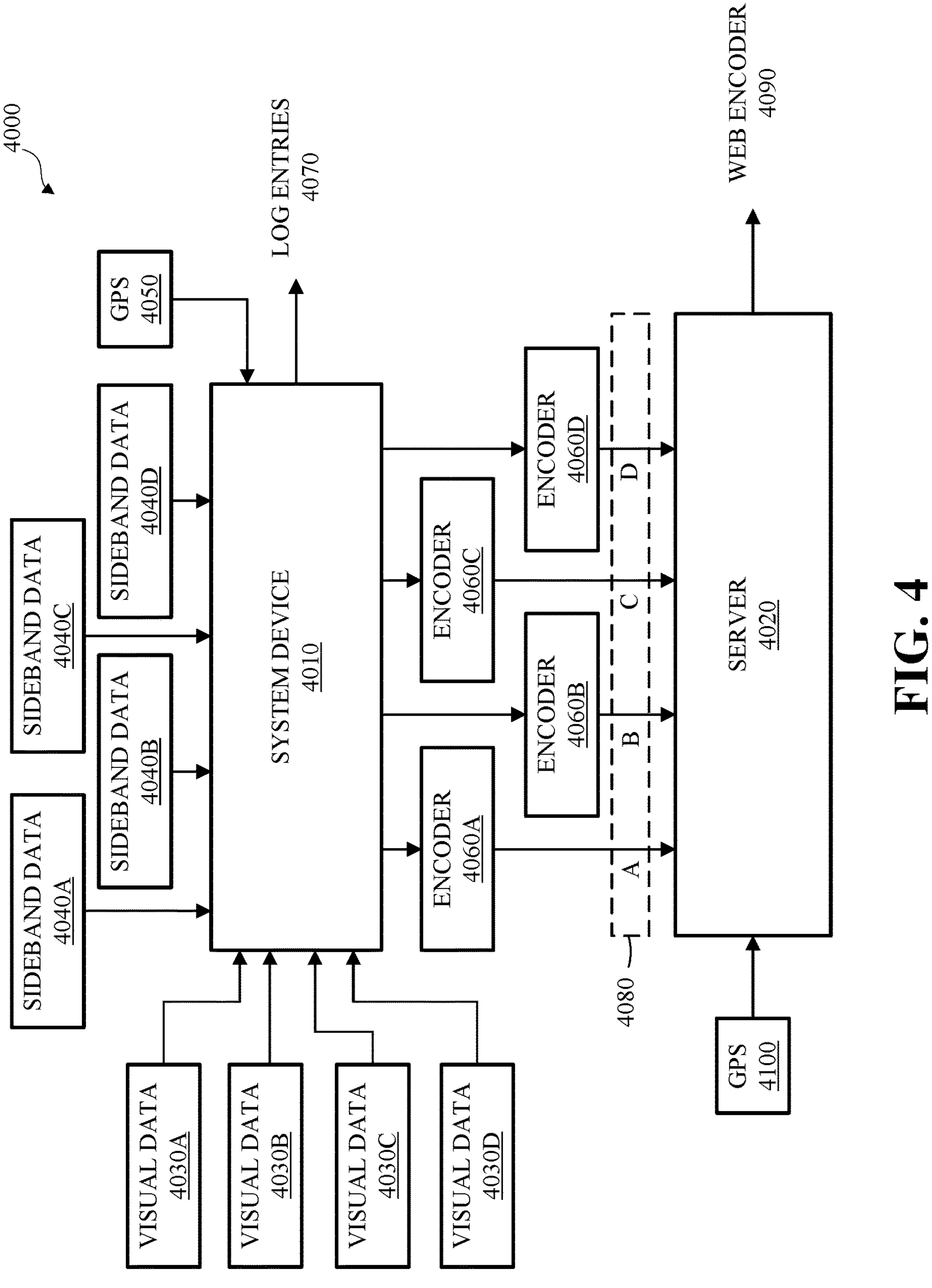
FIG. 4 is a block diagram of an example of a system for transmitting sideband data to enable tele-operation of a vehicle.

FIG. 4 is a block diagram of an example of a system 4000 for transmitting sideband data to enable tele-operation of a vehicle. The system 4000 may include a system device 4010 and a server 4020. The system device 4010 may be implemented by a vehicle in a transportation network, such as the vehicle 2100 in the transportation network 2200 of FIG. 2. For example, the system device 4010 could be implemented by the controller 1300 of the vehicle 1050 of FIG. 1. In some implementations, the system device 4010 could utilize a robot operating system (ROS). The server 4020 could be implemented by a computing device of the operations center 2400, such as the controller apparatus 2410. For example, the server 4020 could support a tele-operator to perform tele-operation of the vehicle, such as the tele-operators 3020/3030 performing tele-operation of the vehicle 3040/3050/3060/3070 of FIG. 3. In some implementations, the server 4020 could implement Real-Time Streaming Protocol (RTSP), Real-Time Messaging Protocol (RTMP), or Reliable Internet Stream Transport (RIST) when communicating with the system device 4010 and the vehicle.

The vehicle (e.g., using the controller 1300 implemented by the vehicle) can generate visual data from sensors (e.g., the one or more on-vehicle sensors 2102 of FIG. 2) while operating in the transportation network, such as visual data 4030A to 4030D. The system device 4010 can receive the visual data 4030A to 4030D. For example, the visual data 4030A to 4030D may include images collected from cameras of the vehicle, such as visual data 4030A including one or more images from a front facing camera, visual data 4030B including one or more images from a left facing camera, visual data 4030C including one or more images from a right facing camera, and visual data 4030D including one or more images from a rear facing camera. In some implementations, the visual data 4030A to 4030D may be encoded based on H.264. In another example, the visual data 4030A to 4030D could include point cloud data collected from Lidar sensors of the vehicle, such as visual data 4030A including point cloud data from a first Lidar sensor, visual data 4030B including point cloud data from a second Lidar sensor, visual data 4030C including point cloud data from a third Lidar sensor, and visual data 4030D including point cloud data from a fourth Lidar sensor. Although four elements of visual data are shown and described by example (e.g., visual data 4030A to 4030D), other numbers of visual data may be present in the system 4000.

The vehicle (e.g., using the controller 1300 implemented by the vehicle) can also generate sideband data while operating in the transportation network, such as sideband data 4040A to 4040D (e.g., text injections). The system device 4010 can receive the sideband data 4040A to 4040D. The sideband data 4040A to 4040D may encapsulate a serialization of vehicle information collected using one or more sensors of the vehicle (e.g., the one or more on-vehicle sensors 2102 of FIG. 2). For example, the vehicle information could indicate vehicle data relating to the state or condition of the vehicle and its surroundings including any of object detection (e.g., obstacles, such as fixed obstacles, vehicles, cyclists, and pedestrians); vehicle velocity; vehicle location; vehicle operational state; vehicle destination; vehicle route; and vehicle sensor data. The vehicle information may be serialized to form the sideband data 4040A to 4040D to enable transmission and reconstruction of the vehicle information by the server 4020. For example, the sideband data 4040A to 4040D may be formatted (e.g., serialized) according to JSON, YAML, BSON, or MessagePack. Thus, in some cases, the serialization may include human-readable text (e.g., serialization based on JSON or YAML). Serializing the vehicle information and encapsulating as the sideband data 4040A to 4040D may advantageously provide flexibility for communicating vehicle information and other data to the server 4020 to enable tele-operation. Although four elements of sideband data are shown and described by example (e.g., sideband data 4040A to 4040D), other numbers of sideband data may be present in the system 4000.

In some cases, the sideband data 4040A to 4040D may encapsulate multiple components of vehicle information. For example, the sideband data 4040A may encapsulate object detection, vehicle velocity, and vehicle location, and the sideband data 4040B may encapsulate vehicle operational state, vehicle destination, and vehicle route. In some cases, the sideband data 4040A to 4040D may encapsulate different components of vehicle information. For example, the sideband data 4040A may encapsulate object detection, the sideband data 4040B may encapsulate vehicle velocity, the sideband data 4040C may encapsulate vehicle location, and the sideband data 4040C may encapsulate vehicle operational state. In some cases, the sideband data 4040A to 4040D may encapsulate vehicle information corresponding to different visual data 4030A to 4030D. For example, sideband data 4040A may encapsulate vehicle information (e.g., object detection from a front facing sensor) corresponding to visual data 4030A (e.g., the front facing camera), sideband data 4040B may encapsulate vehicle information (e.g., object detection from a left facing sensor) corresponding to visual data 4030B (e.g., the left facing camera), sideband data 4040C may encapsulate vehicle information (e.g., object detection from a right facing sensor) corresponding to visual data 4030C (e.g., the right facing camera), and sideband data 4040D may encapsulate vehicle information (e.g., object detection from a rear facing sensor) corresponding to visual data 4030D (e.g., the rear facing camera). In some cases, the sideband data 4040A to 4040D may encapsulate vehicle information corresponding to particular visual data 4030A to 4030D. For example, sideband data 4040A to 4040D may encapsulate vehicle information corresponding to visual data 4030A (e.g., the front facing camera). Thus, generating the sideband data 4040A to 4040D as a serialization of the vehicle information can provide flexibility for providing information in a number of ways.

The vehicle (e.g., using the controller 1300 implemented by the vehicle) can also access a time from a GPS unit 4050 while operating in the transportation network. The system device 4010 can receive the time from the GPS unit 4050. The system device 4010 can apply timing information, based on the time, to the visual data 4030A to 4030D and the sideband data 4040A to 4040D. For example, the system device 4010 can apply timestamps to images of the visual data 4030A to 4030D, and timestamps to vehicle information serialized in the sideband data 4040A to 4040D. A timestamp may include a sequence of characters or encoded information that identifies when an event occurred (e.g., a date and/or time of day). The timing information applied to the visual data 4030A to 4030D and the sideband data 4040A to 4040D may enable the server 4020 to correlate the sideband data 4040A to 4040D to the visual data 4030A to 4030D by matching timing information to within a threshold. For example, the server 4020 can match timestamps associated with the visual data 4030A to 4030D to timestamps associated with the sideband data 4040A to 4040D to within 1/10th of a second. This may enable correlation of the data (e.g., the vehicle information to the images or point cloud data) to enable tele-operation. In some implementations, the system device 4010 can also generate log entries 4070 comprising the visual data 4030A to 4030D, the sideband data 4040A to 4040D, and/or the timing information. The log entries 4070 may be stored in a database implemented by the vehicle.

The system device 4010 can utilize one or more encoders (e.g., implemented by the controller 1300) to encode the visual data 4030A to 4030D and the sideband data 4040A to 4040D as packets in one or more streams. For example, the system device 4010 can utilize encoders 4060A to 4060D to generate four streams (e.g., A, B, C, and D) corresponding to the visual data 4030A to 4030D and sideband data 4040A to 4040D. For example, encoder 4060A may encode visual data 4030A and the sideband data 4040A as packets in a first stream A, encoder 4060B may encode visual data 4030B and sideband data 4040B as packets in a second stream B, encoder 4060C may encode visual data 4030C and sideband data 4040C as packets in a third stream C, and encoder 4060D may encode visual data 4030D and sideband data 4040D as packets in a fourth stream D. In some implementations, the encoders 4060A to 4060D may encode the visual data 4030A to 4030D and the sideband data 4040A to 4040D as RTP packets.

The vehicle (e.g., using the controller 1300, using the electronic communication unit 1320 of FIG. 1) can then transmit the one or more streams, including the visual data 4030A to 4030D and the sideband data 4040A to 4040D, to the server 4020. The vehicle can transmit the one or more streams via an electronic communication network 4080 (e.g., which could be the electronic communication network 2300, which may include a LAN, a WAN, a VPN, a mobile or cellular telephone network, the Internet, Campus Wi-Fi, or any other electronic communication system). For example, the vehicle can transmit the one or more streams via cellular communication. In some implementations, the one or more streams may be transmitted to the server 4020 using RTSP, RTMP, or RIST.

The server 4020 (e.g., the controller apparatus 2410) can receive the one or more streams (e.g., A, B, C, and D) from the vehicle. The server 4020 can reference a time. The server 4020 can also access a time from a GPS unit 4100, which may be in synchronization with the GPS unit 4050. The one or more streams can include the visual data 4030A to 4030D and the sideband data 4040A to 4040D that encapsulates the serialization of vehicle information collected using the one or more sensors of the vehicle. The server 4020 can then decode the one or more streams to obtain the visual data 4030A to 4030D and the sideband data 4040A to 4040D. For example, the server 4020 can decode the RTP packets from the encoders 4060A to 4060D. The server 4020 can de-serialize the sideband data 4040A to 4040D to re-construct the vehicle information (e.g., re-create the object), including while using a different computing language. The server 4020 can then correlate the vehicle information to the visual data 4030A to 4030D based on the timing information received in the packets (e.g., using the timestamps to correlate the vehicle information to the images or point cloud data based on matching timings within a threshold). The server 4020 can reference the GPS unit 4100 when processing the timing information received in the packets. This may enable a synchronization to the tele-operator. The server 4020 can then display the visual data 4030A to 4030D and the vehicle information (e.g., from the sideband data 4040A to 4040D) in a web browser by utilizing a web encoder 4090. In some implementations, the web encoder 4090 could be implemented by a web real-time communication (webRTC) encoder. Displaying the visual data 4030A to 4030D and the vehicle information from the sideband data 4040A to 4040D in the web browser may enable a tele-operator to perform tele-operation of the vehicle with improved situational awareness. As a result, the sideband data 4040A to 4040D may enable the vehicle information to be annotated to a real-time stream of the visual data 4030A to 4030D, with a time synchronization to the visual data 4030A to 4030D, without requiring predetermined knowledge of a start and an end of the one or more streams (e.g., A, B, C, and D).

Figure 5:
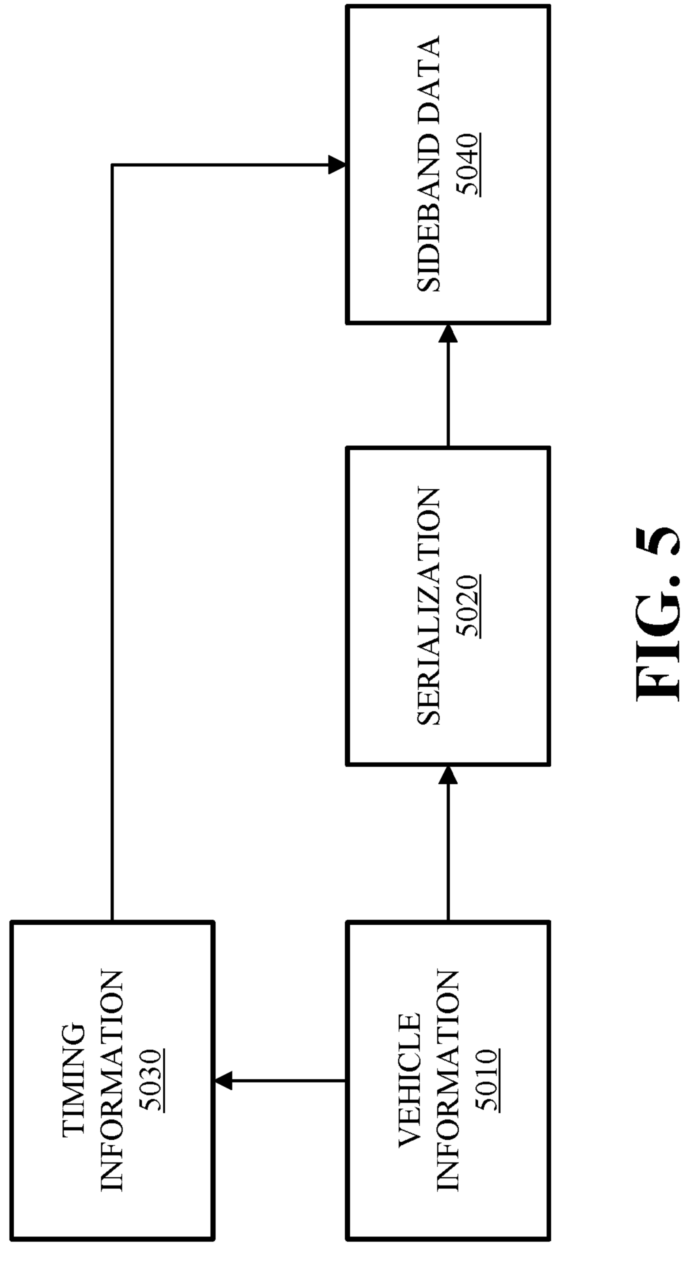
FIG. 5 is a block diagram of an example of generating sideband data.

FIG. 5 is a block diagram of an example of generating sideband data 5040. For example, the sideband data 5040 may correspond to the sideband data 4040A to 4040D of FIG. 4. A system (e.g., the controller 1300 of FIG. 1) can run software to generate the sideband data 5040. The system can collect vehicle information 5010 from one or more sensors of the vehicle. For example, the one or more sensors could be the one or more on-vehicle sensors 2102 of FIG. 2, or the sensor 1360 of FIG. 1. The vehicle information 5010 could indicate, for example, object detections (e.g., obstacles, such as fixed obstacles, vehicles, cyclists, and pedestrians); vehicle velocity; vehicle location (e.g., GPS coordinates, latitude, or longitude); vehicle operational state; vehicle destination; vehicle route; and/or vehicle sensor data. The system can then run a serializer to generate a serialization 5020 (e.g., an object) of the vehicle information 5010. Serializing the vehicle information 5010 may include formatting the vehicle information 5010 according to JSON, YAML, BSON, or MessagePack to enable a server (e.g., the server 4020) to reconstruct the vehicle information 5010 later. In some cases, the serialization 5020 may correspond to human-readable text (e.g., JSON or YAML). The system can also collect timing information 5030 from a GPS unit (e.g., the GPS unit 4050). The timing information 5030 may correspond to the time in which the vehicle information 5010 is collected (which may also correspond to the time in which corresponding visual data is collected, such as the visual data 4030A to 4030D). The system can then encapsulate the serialization 5020 and the timing information 5030 as the sideband data 5040.

Figure 6:
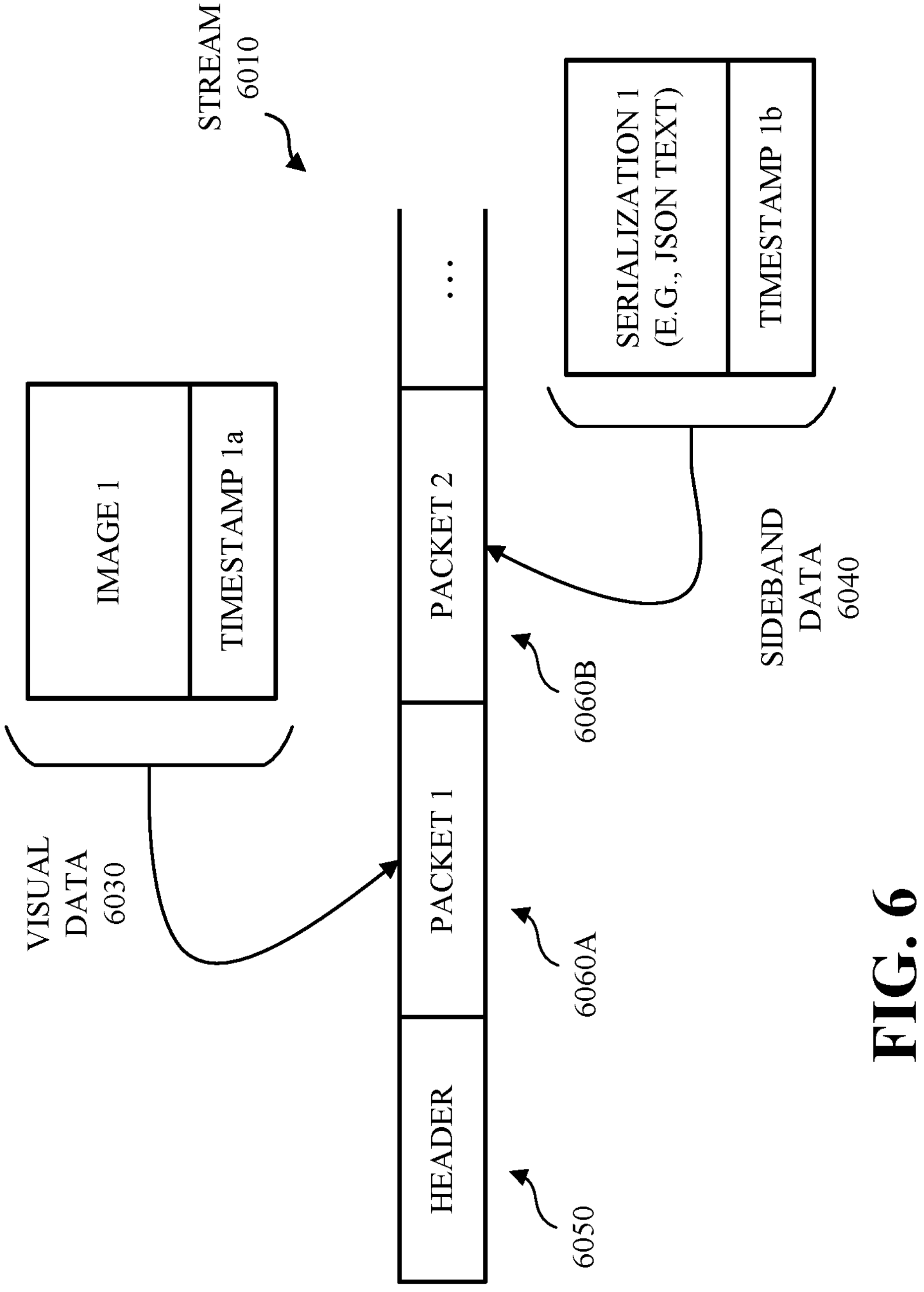
FIG. 6 is a block diagram of an example of generating a stream including visual data and sideband data.

FIG. 6 is a block diagram of an example of generating a stream 6010 including visual data 6030 and sideband data 6040. For example, the visual data 6030 may correspond to one of the visual data 4030A to 4030D, and the sideband data 6040 may correspond to one of the sideband data 4040A to 4040D of FIG. 4. In another example, the sideband data 6040 may correspond to the sideband data 5040 of FIG. 5. A system (e.g., the controller 1300 of FIG. 1, utilizing the system device 4010 of FIG. 4) can run software to generate the stream 6010. The visual data 6030 may include an image (e.g., "image 1," collected from a front facing camera, which could be part of a video stream encoded based on H.264). In some cases, the visual data 6030 may include other data, such as a scan frame of a point cloud. The visual data 6030 may also include first timing information (e.g., "timestamp 1*a*") corresponding to when the visual data 6030 was collected. The sideband data 6040 may include a serialization of the vehicle information (e.g., "serialization 1," collected from one or more sensors of the vehicle). The sideband data 6040 may also include second timing information (e.g., "timestamp 1*b*") corresponding to when the sideband data 6040 was collected. The second timing information may enable the sideband data 6040 to be correlated to the first timing information (e.g., "timestamp 1*b*" may match "timestamp 1*a*" within a threshold).

The stream 6010 may include a header 6050 and multiple packets, such as packets 6060A and 6060B (e.g., a payload). The system can configure the header 6050 to include, among other things, a source address and a destination address. The source address may correspond to a network address of the vehicle (e.g., associated with the controller 1300, and the system device 4010), and the destination address may correspond to a network address of the server (e.g., associated with the controller apparatus 2410, and the server 4020). The header 6050 may enable the stream 6010 to be transmitted from the vehicle to the server. The system can encode the visual data 6030 and the sideband data 6040 as packets in the stream 6010, such as the visual data 6030 encoded as the packet 6060A, and the sideband data 6040 encoded as the packet 6060B. For example, the system can utilize the encoders 4060A to 4060D to encode the visual data 6030 and the sideband data 6040 as the packets 6060A and 6060B in the stream 6010. The vehicle information (e.g., "serialization 1,") may be limited to one packet (e.g., the packet 6060A). In some implementations, the header 6050 may be encoded as an RTP header, and the packets 6060A and 6060B may be encoded as RTP packets. In some implementations, the stream may be transmitted using RTSP, RTMP, or RIST. Although one stream two packets are shown and described by example (e.g., packets 6060A and 6060B), other numbers of streams and packets may be generated in the system. The vehicle information (e.g., "serialization 1,") may be limited to one packet.

Figure 7:
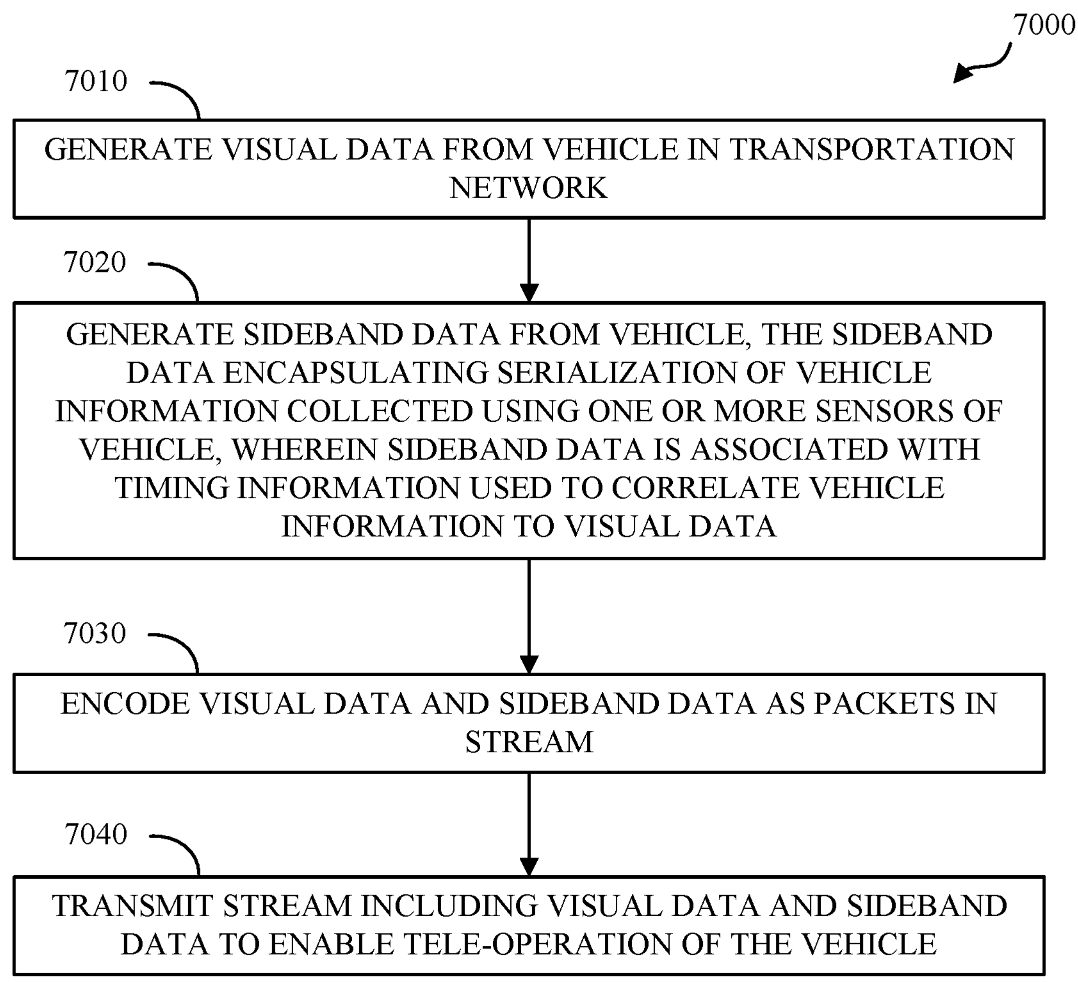
FIG. 7 is a flowchart of an example of a process for transmitting sideband data to enable tele-operation of a vehicle.

To further describe some implementations in greater detail, reference is next made to examples of techniques which may be performed by or using an overlay. FIG. 7 is a flowchart of an example of a process for transmitting sideband data to enable tele-operation of a vehicle. The process 7000 can be executed using computing devices, such as the systems, hardware, and software described with respect to FIGS. 1-6. The process 7000 can be performed, for example, by executing a machine-readable program or other computer-executable instructions, such as routines, instructions, programs, or other code. The steps, or operations, of the process 7000 or another technique, method, process, or algorithm described in connection with the implementations disclosed herein can be implemented directly in hardware, firmware, software executed by hardware, circuitry, or a combination thereof.

For simplicity of explanation, the process 7000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 7010, a vehicle (e.g., using the controller 1300, implemented by the vehicle 2100) can generate visual data from sensors of the vehicle (e.g., the one or more on-vehicle sensors 2102) while operating in a transportation network. For example, the visual data may correspond to the visual data 4030A to 4030D of FIG. 4 or the visual data 6030 of FIG. 6. In one example, the visual data could comprise images collected from cameras of the vehicle, such as visual data comprising images from a front facing camera, a left facing camera, a right facing camera, and/or a rear facing camera. In another example, the visual data could comprise point cloud data collected from Lidar sensors of the vehicle, At 7020, the vehicle (e.g., using the controller 1300, implemented by the vehicle 2100) can generate sideband data from the vehicle. For example, the sideband data may correspond to the sideband data 4040A to 4040D of FIG. 4, the sideband data 5040 of FIG. 5, or the sideband data 6040 of FIG. 6. The sideband data may encapsulate a serialization of vehicle information collected using one or more sensors of the vehicle (e.g., the serialization 5020). The sideband data may be associated with timing information used to correlate the vehicle information to the visual data (e.g., the timing information 5030). For example, the vehicle can apply the timing information, based on a time from a GPS (e.g., the GPS unit 4050), to the sideband data to enable a server to correlate the vehicle information to the visual data.

At 7030, the vehicle (e.g., using the controller 1300, utilizing the system device 4010) can encode the visual data and the sideband data as packets in a stream. For example, the vehicle can utilize one or more encoders (e.g., the encoders 4060A to 4060D) to encode the visual data and the sideband data as packets (e.g., the packets 6060A and 6060B) in one or more streams (e.g., the streams A, B, C, and D of FIG. 4, or the stream 6010). In some implementations, the encoders may encode the visual data and the sideband data as RTP packets.

At 7040, the vehicle (e.g., using the controller 1300, utilizing the system device 4010) can transmit the streams including the visual data and the sideband data to enable tele-operation of the vehicle. For example, the vehicle (e.g., using the controller 1300) can use an electronic communication unit (e.g., the electronic communication unit 1320) to transmit the stream to the server. In some implementations, the vehicle can transmit the stream via cellular communication (e.g., using a cellular telephone network), Campus Wi-Fi, or other radio link. In some implementations, the one or more streams may be transmitted to the server using RTSP, RTMP, or RIST.

Figure 8:
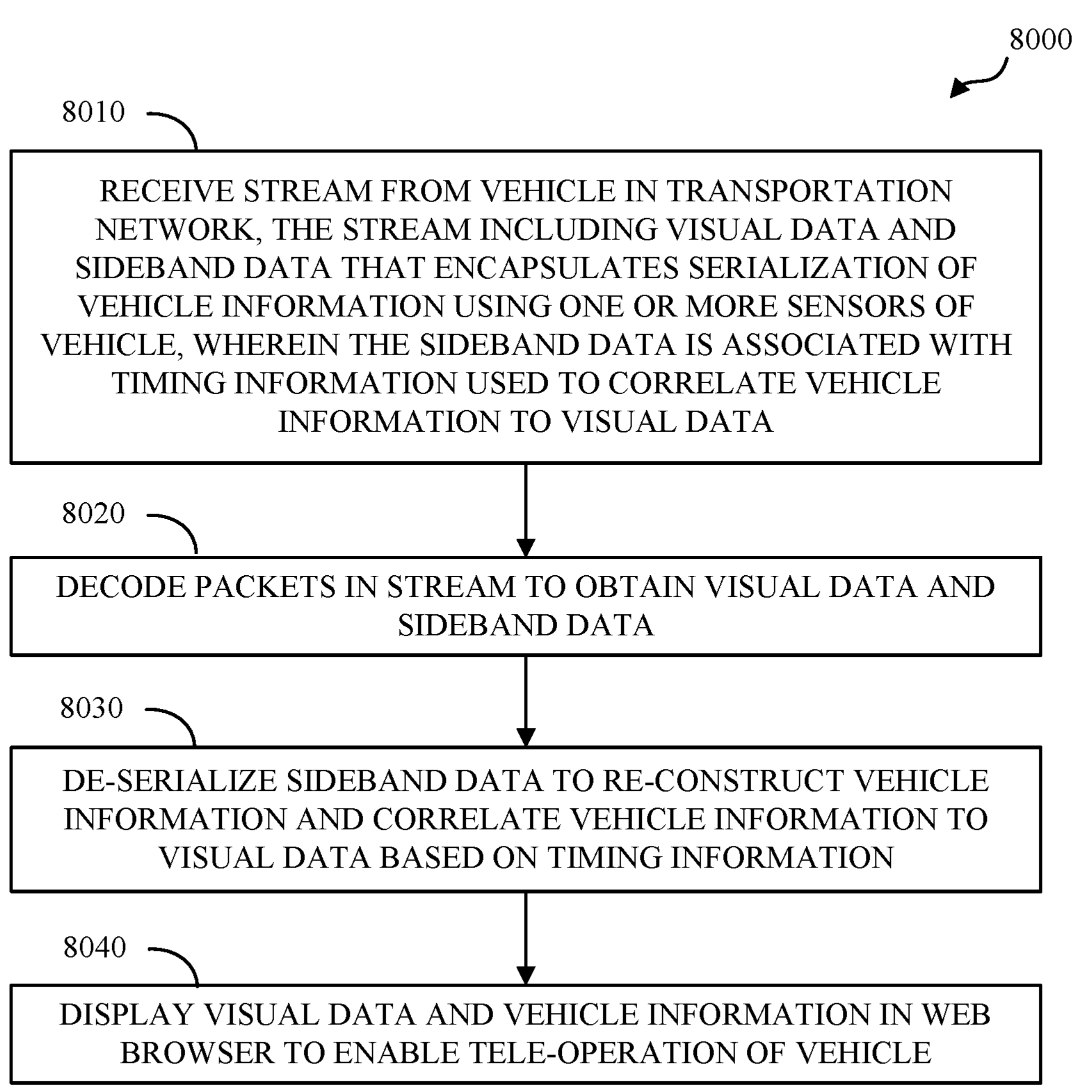
FIG. 8 is a flowchart of an example of process for receiving sideband data to enable tele-operation of a vehicle.

FIG. 8 is a flowchart of an example of a process for receiving sideband data to enable tele-operation of a vehicle. The process 8000 can be executed using computing devices, such as the systems, hardware, and software described with respect to FIGS. 1-6. The process 8000 can be performed, for example, by executing a machine-readable program or other computer-executable instructions, such as routines, instructions, programs, or other code. The steps, or operations, of the process 8000 or another technique, method, process, or algorithm described in connection with the implementations disclosed herein can be implemented directly in hardware, firmware, software executed by hardware, circuitry, or a combination thereof.

For simplicity of explanation, the process 8000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 8010, a system (e.g., the controller apparatus 2410, utilizing the server 4020) can receive a stream from a vehicle in a transportation network. The stream may include visual data and sideband data. The sideband data may encapsulate a serialization of vehicle information collected using one or more sensors of the vehicle. The sideband data may be associated with timing information used to correlate the vehicle information to the visual data. For example, the system can receive a stream generated by a vehicle based on the process 7000.

At 8020, the system can decode the packets in the stream to obtain the visual data and the sideband data. For example, a server (e.g., the server 4020) can decode one or more streams (e.g., the streams A, B, C, and D of FIG. 4, or the stream 6010) from the vehicle to obtain the visual data and the sideband data. For example, the server can decode RTP packets from the encoders of the vehicle.

At 8030, the system can de-serialize the sideband data to re-construct the vehicle information and correlate the vehicle information to the visual data based on timing information. For example, the server 4020 can de-serialize the sideband data based on a predetermined serialization formatted using JSON, YAML, BSON, or MessagePack. This may enable the server 4020 to re-construct the vehicle information (e.g., re-create the object), including while using a different computing language. The server can then correlate the vehicle information to the visual data based on the timing information (e.g., using timestamps to correlate the vehicle information to images or point cloud data based on matching timings between the vehicle information and images or point cloud data to within a threshold).

At 8040, the system can display the visual data and the vehicle information in a web browser to enable tele-operation of the vehicle. For example, the server 4020 can display the visual data and the vehicle information (e.g., from the sideband data) in a web browser by utilizing a web encoder. In some implementations, the web encoder could be implemented by a webRTC encoder. Displaying the visual data and the vehicle information from the sideband data in the web browser may enable a tele-operator to perform tele-operation of the vehicle with improved situational awareness.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:

generating visual data from a vehicle in a transportation network, wherein the visual data is associated with visual timing information corresponding to when the visual data was collected;

generating sideband data from the vehicle, the sideband data encapsulating a serialization of vehicle information collected using one or more sensors of the vehicle, wherein the sideband data is associated with sideband timing information corresponding to when the vehicle information was collected;

encoding the visual data and the visual timing information into one or more visual data packets;

encoding the sideband data and the sideband timing information into one or more sideband data packets;

generating a single stream comprising the one or more visual data packets and the one or more sideband data packets; and transmitting the single stream including the visual data and the sideband data to enable tele-operation of the vehicle, wherein the visual timing information and the sideband timing information are used to correlate the vehicle information to the visual data.

2. The method of claim 1, wherein the visual data comprises one or more images collected from a camera of the vehicle.

3. The method of claim 1, wherein the visual data comprises point cloud data collected from a Lidar sensor of the vehicle.

4. The method of claim 1, wherein the sideband data is formatted according to at least one of JavaScript Object Notation (JSON), YAML, Binary JSON (BSON), or MessagePack to enable reconstruction of the vehicle information by a server.

5. The method of claim 1, wherein the one or more visual data packets and the one or more sideband data packets are Real-time Transport Protocol (RTP) packets in the single stream.

6. The method of claim 1, wherein the single stream is transmitted, via cellular communication, to a server using Real-Time Streaming Protocol (RTSP).

7. The method of claim 1, further comprising:

applying the sideband timing information, based on a time from a global positioning system and before transmitting the single stream, to the sideband data to enable a server to correlate the vehicle information to the visual data.

8. The method of claim 1, further comprising:

receiving the single stream that includes the visual data and the sideband data;

de-serializing the sideband data to re-construct the vehicle information; and displaying the visual data and the vehicle information in a web browser to perform the tele-operation.

9. The method of claim 1, wherein the vehicle information indicates an object detection and a vehicle location in the transportation network.

10. The method of claim 1, wherein the visual timing information and the sideband timing information are used to correlate the vehicle information to the visual data by determining that the visual timing information and the sideband timing information are within a threshold.

11. An apparatus, comprising:

a memory; and a processor configured to execute instructions stored in the memory to:

generate visual data from a vehicle in a transportation network, wherein the visual data includes a visual data timestamp corresponding to when the visual data was collected;

generate sideband data from the vehicle, the sideband data encapsulating a serialization based on JSON of vehicle information collected using one or more sensors of the vehicle, wherein the sideband data includes a sideband data timestamp corresponding to when the vehicle information was collected;

encode the visual data and the visual data timestamp into a visual data packet;

encode the sideband data and the sideband data timestamp into a sideband data packet;

generate a single stream comprising the visual data packet and the sideband data packet; and transmit the single stream including the visual data and the sideband data to enable tele-operation of the vehicle, wherein the visual data timestamp and the sideband data timestamp are used to correlate the vehicle information to the visual data.

12. The apparatus of claim 11, wherein the visual data comprises one or more images collected from a camera of the vehicle.

13. The apparatus of claim 11, wherein the visual data packet and the sideband data packet are each Real-time Transport Protocol (RTP) packets in the single stream.

14. The apparatus of claim 11, wherein the single stream is transmitted, via Campus Wi-Fi, to a server using at least one of Real-Time Messaging Protocol (RTMP) or Reliable Internet Stream Transport (RIST).

15. The apparatus of claim 11, wherein the processor is further configured to execute instructions stored in the memory to:

apply the sideband data timestamp, based on a time from a global positioning system and before transmitting the single stream, to the sideband data to enable a server to correlate the vehicle information to the visual data.

16. A non-transitory computer readable medium storing instructions operable to cause one or more processors to perform operations comprising:

receiving a single stream from a vehicle in a transportation network, the single stream including packets of visual data and packets of sideband data, wherein each packet of visual data comprises visual data generated by the vehicle and visual timing information corresponding to when the visual data was collected, and wherein each packet of sideband data comprises sideband data encapsulating a serialization of vehicle information collected using one or more sensors of the vehicle and sideband timing information corresponding to when the vehicle information was collected;

de-serializing the sideband data to re-construct the vehicle information and correlate the vehicle information to the visual data based on the visual timing information and the sideband timing information; and displaying the visual data and the vehicle information in a web browser to enable tele-operation of the vehicle.

17. The non-transitory computer readable medium of claim 16, wherein the serialization includes human-readable text.

18. The non-transitory computer readable medium of claim 16, wherein the packets of visual data and the packets of sideband data are RTP packets in the single stream, the operations further comprising:

decoding the RTP packets in the single stream to obtain the visual data and the sideband data.

19. The non-transitory computer readable medium of claim 16, wherein the single stream is received, via a cellular telephone network, by a server using a port configured for real-time video transport.

20. The non-transitory computer readable medium of claim 16, wherein the vehicle is an autonomous vehicle (AV) and the vehicle information indicates vehicle velocity; vehicle location; vehicle operational state; vehicle destination; vehicle route; and vehicle sensor data.

* * * * *